No. 685,442. Patented Oct. 29, 1901.
A. CAMPBELL.
COTTON HARVESTER.
(Application filed Apr. 15, 1901.)
(No Model.) 5 Sheets—Sheet 3.
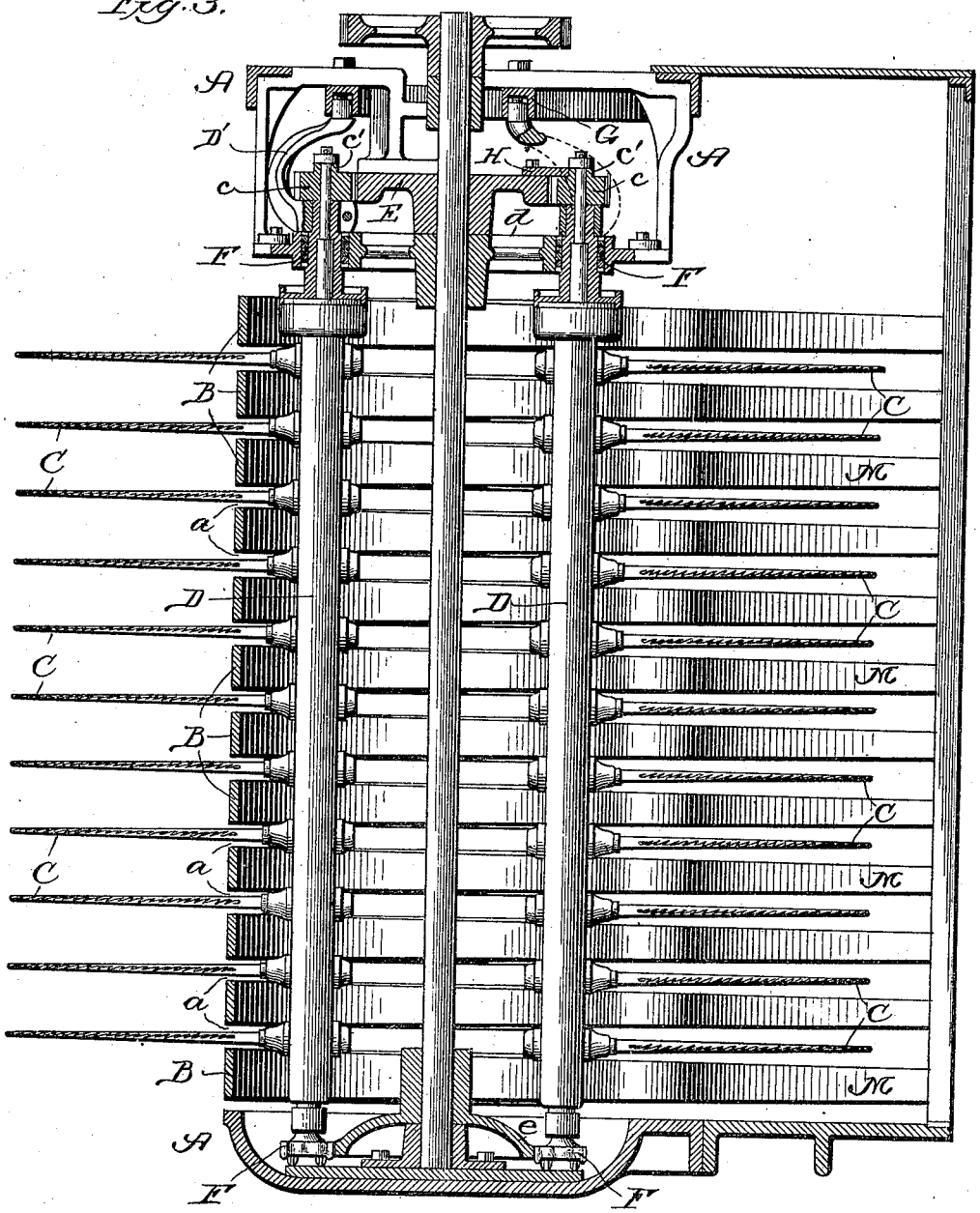

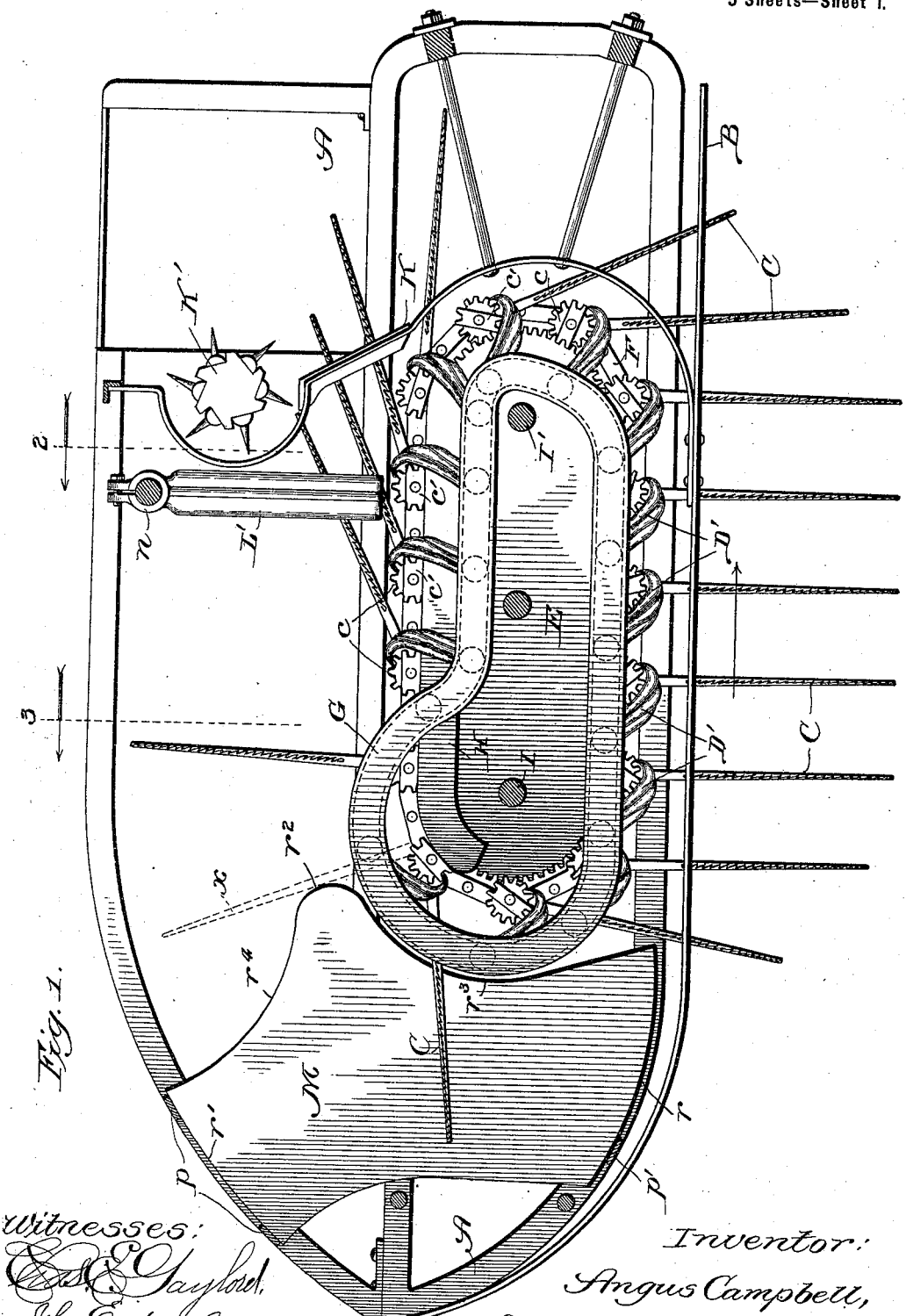

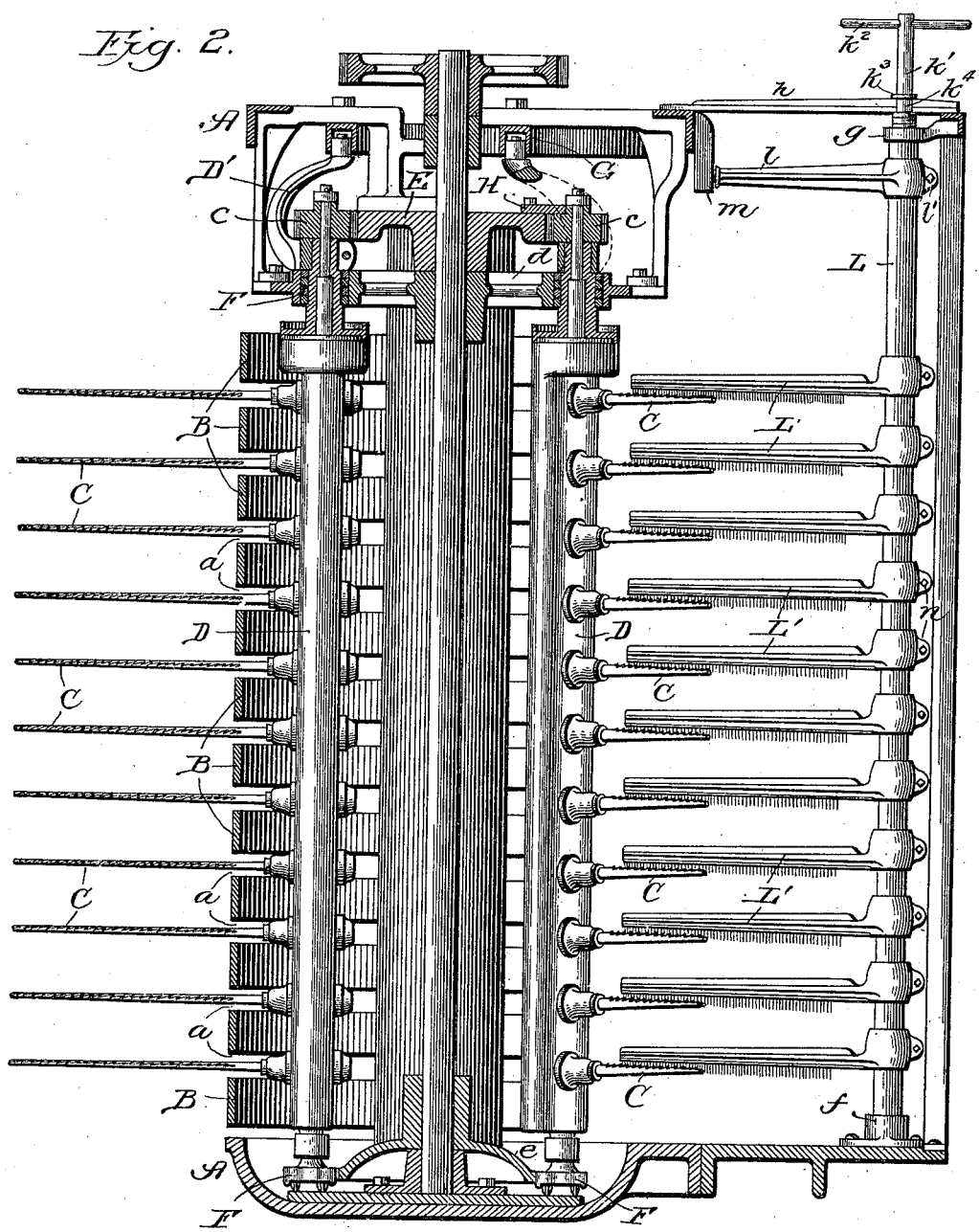

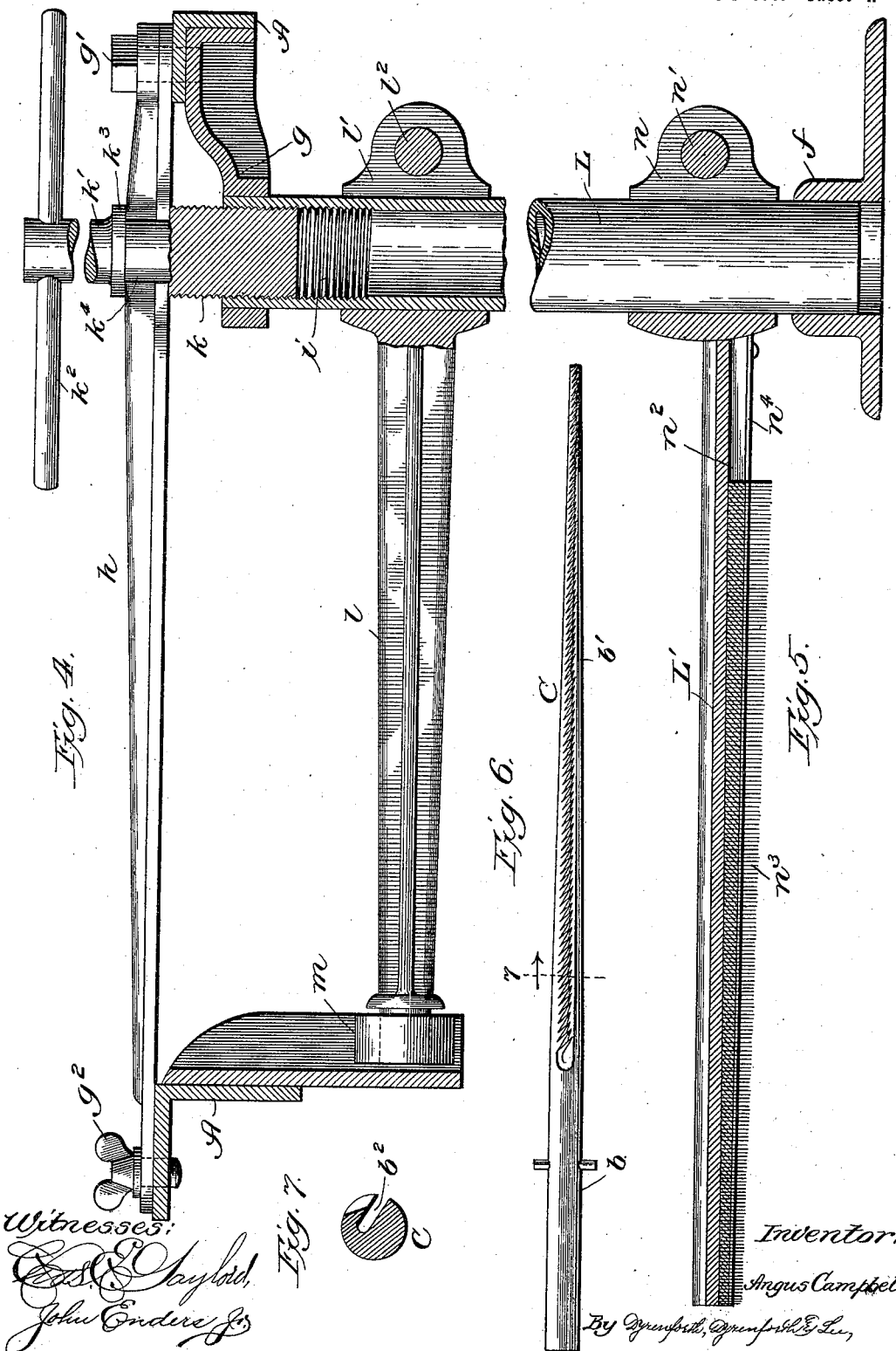

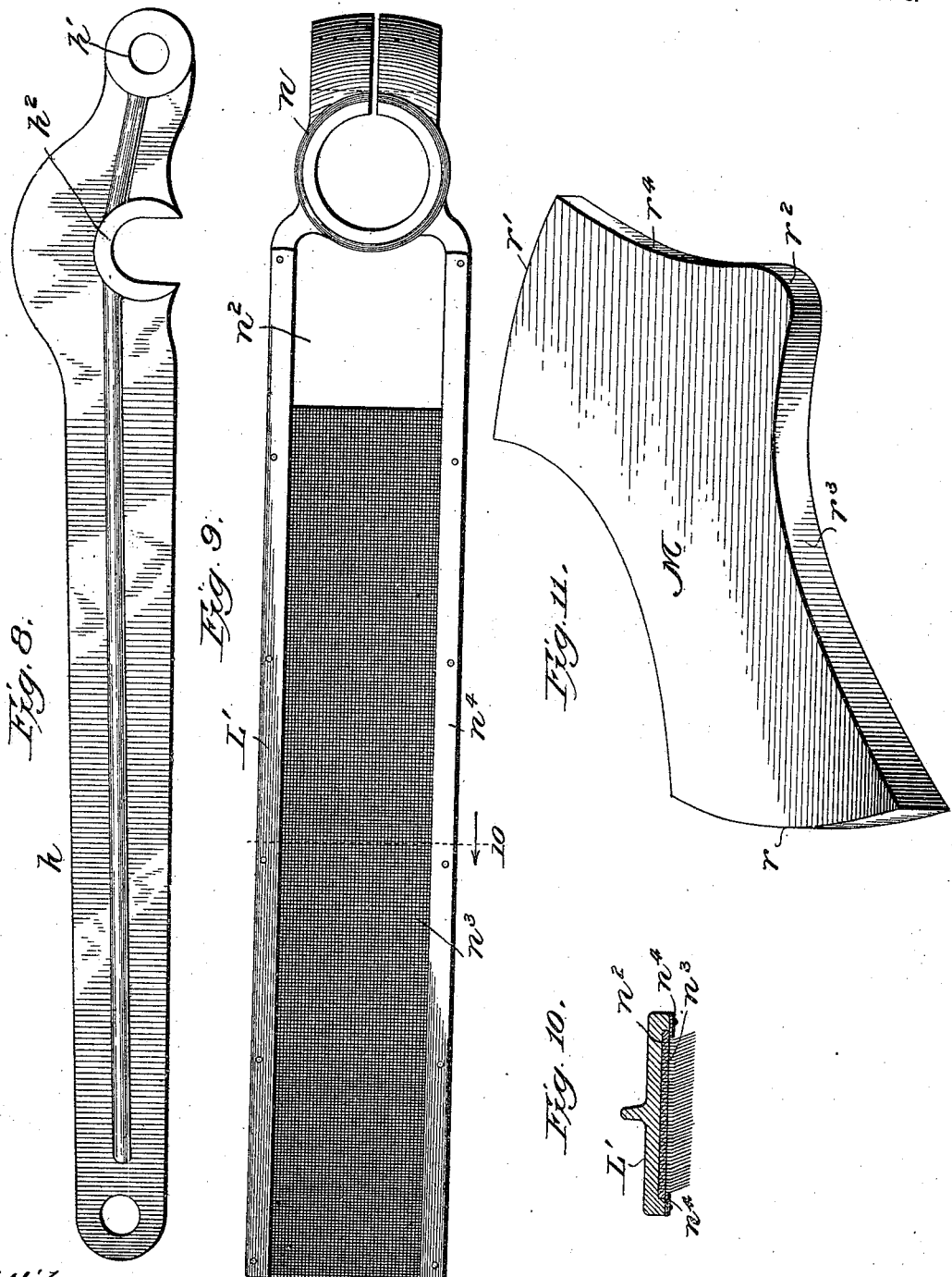

UNITED STATES PATENT OFFICE.

ANGUS CAMPBELL, OF PITTSBURG, PENNSYLVANIA, ASSIGNOR TO AMERICAN COTTON PICKER COMPANY, OF PITTSBURG, PENNSYLVANIA, A CORPORATION OF PENNSYLVANIA.

COTTON-HARVESTER.

SPECIFICATION forming part of Letters Patent No. 685,442, dated October 29, 1901.

Application filed April 15, 1901. Serial No. 55,890. (No model.)

*To all whom it may concern:*

Be it known that I, ANGUS CAMPBELL, a citizen of the United States, residing at Pittsburg, in the county of Allegheny and State of Pennsylvania, have invented a new and useful Improvement in Cotton-Harvesters, of which the following is a specification.

My invention relates to improvements in cotton-harvesting machines of the type wherein picker stems or spindles are thrust into the plants to gather the cotton and drawn longitudinally after leaving the plants through stripper mechanism to slide the cotton from the stems.

It also relates to improvements in cotton-harvesting machines wherein the picker-stems are given a translating movement and thrust longitudinally into the plants.

My improvements are adapted more especially for use in a cotton-harvesting machine of my invention for which Letters Patent of the United States No. 542,794 were granted July 16, 1895, and in the present drawings I have shown so much of a machine of that type as is thought necessary to illustrate therewith the construction and mode of operation of my present improvements.

In the drawings, Figure 1 is a horizontal section through one of a pair of casings, which in practice are mounted upon suitable running-gear, from which the moving parts are actuated. For an understanding of the construction of the machine as a whole I draw attention to my aforesaid Letters Patent, and more particularly to a separate concurrent application filed by me the 15th day of April, 1901, Serial No. 55,888. Figs. 2 and 3 are vertical cross-sections taken, respectively, on lines 2 and 3 of Fig. 1 and viewed as indicated by the arrows; Fig. 4, a broken and partly-sectional elevation of the upper part of picker-stem-cleaning mechanism; Fig. 5, a similar view of the lower part of said mechanism; Fig. 6, a view of one of the picker spindles or stems; Fig. 7, a section on line 7 in Fig. 6; Fig. 8, a top plan view of the top bar of said stripper mechanism; Fig. 9, a bottom plan view of one of a series of cleaning-arms; Fig. 10, a section taken on line 10 in Fig. 9, and Fig. 11 a perspective view of one of a series of picker-stem straightening and guiding boards.

A is the frame of one of the casings, which is provided along its inner side with a series of slats B, forming between them horizontal openings $a$ for the passage of the picker-stems C. The picker-stem which I now prefer to employ is shown most plainly in Figs. 6 and 7 and is described and claimed in the application for Letters Patent, Serial No. 53,054, filed by me March 27, 1901. It has a shank $b$ and a tapering stem portion $b'$, provided with a longitudinally-extending groove $b^2$. The stem at one side of this groove is formed with a series of serrations, producing cotton-engaging teeth, which project part way over the groove and are slantingly disposed to point in a direction at an acute angle toward the free end of the stem. The stems are mounted at their shanks in vertical tubes or carriers D. In each casing A in the construction shown are fifteen carriers, each provided with eleven picker-stems. In the carriers are driving-gears for rotating the spindles on their individual axes, the driving being effected by the engagement of pinions $c$ on the carriers with the teeth of a stationary rack-plate E, which teeth are in the forward edge and opposite ends of the rack-plate. The carriers are linked together by means of upper and lower chains F to travel an endless course, as indicated. On the carriers are upward and spirally extending arms $D'$, moving at their free ends in an endless guide or race G, of the form shown in Fig. 1. On the pinions $c$ are guide-lugs $c'$, adapted to slide against a guide H on the rack-plate E. The guide H extends between the ends of the series of teeth at the rear or straight-edged side of the rack-plate. The upper and lower endless chains, in which the carriers have their bearings, are rotated from upper and lower sprocket-wheels $d$ $e$ on forward and rear vertical shafts I I', respectively, and the carriers and spindles are moved in the direction of the arrow in Fig. 1. The driving mechanism and cam-guides for the carriers operate to translate them around the two centers formed by the shafts I I', whereby the picker-stems are thrust longitudinally into the cotton-plants to an extended position and rotated and moved with the carriers along a straight course in the backward direction and then withdrawn longitudinally out of the plants and through stripper mechanism K. The drive mechanism is so regulated with relation to the running-gear of the machine from which it is operated that the carriers move in the backward direction at the same speed approximately as the forward movement of the machine, whereby when the picker-stems are thrust into the plants they remain in a position substantially stationary therewith for a prolonged time and while rotating on their individual axes until withdrawn from the plants.

The stripping mechanism K and spiked roller K' (shown in Fig. 1) are fully described in a separate concurrent application filed by me on the 15th day of April, 1901, Serial No. 55,889. It will suffice to say that the stripper mechanism consists of a series of stripping-slats, between which the stems are drawn longitudinally before the translating movement thereof at the forward end of the machine.

Although the picker-stems while in the plants are stationary or nearly stationary therewith, they are apt while rotating to contact with the stems or branches of the cotton-plants and become coated with sap, which tends to clog the teeth of the picker-stems, and thus prevent their taking proper hold of the cotton in the plants.

The first object of my present invention is to provide means for cleaning the picker-stems when desired of any sap or the like that may adhere thereto and interfere with their function. As the picker-stems are thrust outward through the openings $a$ between the slats B, there is danger that they may strike the stems of plants in such a way as to become bent. Such bending of the picker-stems, particularly if near the shanks, will tend to interfere with their passing through the openings $a$ and also with their proper relative positions when extended into the plants.

The second object of my present invention is to provide means for straightening the picker-stems in the event that they become bent and to insure their passing without obstruction through the openings $a$.

I will first describe the stem-cleaning means, which is located in the path of the stems beyond the stripper mechanism in both of the casings.

L is a stationary hollow shaft confined at its lower end in a bearing-cup $f$ in the base of the casing and held at its upper end in an opening through a bracket $g$, secured in the upper part of the frame. Fastened to the top bars, which form part of the upper frame of the machine, is a bar $h$, shaped as shown in Figs. 4 and 8. The bar $h$ has an opening $h'$, at which it is pivoted by a bolt $g'$ to the frame, and in its opposite end it has an opening, at which it may be fastened with a pin or bolt $g^2$. The hollow shaft L is internally threaded, as shown at $i$, along its upper end portion to receive a screw $k$ on a stem $k'$, provided with an operating-handle $k^2$. On the stem $k'$ is a flange $k^3$, and between the said flange and threaded shank portion $k$ it has a reduced neck $k^4$. A socket $h^2$ in the bar $h$ is adapted to embrace the neck $k^4$ to hold the screw against raising or lowering when it is turned. The engagement of the screw with the threads $i$ in the shaft L causes it when the handle $k^2$ is turned to raise or lower the shaft L in its bearings $f$ $g$. Below the bar $h$ is a steadying-bar $l$, having a perforated and divided head $l'$ fitting around the shaft L. The divided head forms a clamp, tightened by means of a screw $l^2$, to fasten the bar $l$ to the shaft. At its free end the bar $l$ enters a vertical guide-groove $m$ on a stationary portion of the frame A. As the shaft L is raised and lowered for the purpose hereinafter explained the free end of the bar $l$ will move up and down in the guide-groove $m$, but hold the shaft against axial movement. Just above the path of each of the eleven picker-stems C on each carrier is an arm L', having a perforated clamping-head $n$ adjustably fastened to the shaft L by means of a clamping-screw $n'$. Each arm L' is ribbed upon its upper side and provided on its under side with a longitudinally-extending channel $n^2$ to receive a strip of carding $n^3$, which is held in place by means of inwardly-projecting clamp-plates $n^4$, fastened to the arm at opposite edges of the carding-strip. The carding-strip may be a wire brush of common construction. The arms L', carrying the carding or brushes on their under sides, form picker-stem cleaners adjustable to extend across the paths of the picker-stems, as shown in Fig. 1. The rotating mechanism for the picker-stems is so constructed that when the axial rotation of the stems is stopped before or as they pass through the stripper mechanism the engagement of the lugs $c'$ with the guide H causes the serrations to be presented at the upper sides of the stems. In the present drawings I have shown picker-stems each having but one longitudinal series of teeth. If stems are provided with two or three series of teeth, the gearing between the pinions $c$ and stems to drive the latter may be so arranged that in successive movements of the lugs $c'$ to the guide H the series of teeth on the stems would be turned successively to the uppermost or cleaning position. When it is desired to clean the teeth of the stems, the shaft L is lowered, as described, by turning the handle $k^2$ until the brushes or carding extend in the path of the stems. In the travel of the carriers the stems are drawn longitudinally and may be swung more or less laterally against the brushes or carding, which will enter between the teeth and remove all sap and the like therefrom. It is only necessary to bring the cleaning mechanism into operation occasionally, and therefore when all the picker-stems have been cleaned or wiped, as stated, the shaft L may be raised to raise the wipers or brushes out of the paths of the picker-stems.

I will next describe the picker-stem straightening and guiding means before mentioned. In the main frame of the casing I provide stationary vertical bars $p$ $p'$.

M M are horizontal and parallel plates or boards constructed, preferably, as shown in the perspective view, Fig. 11. Each board is fastened at its edge $r$ to the bar $p'$ and at its edge $r'$ to the bars $p$. At the edge $r$ each board M is of a thickness corresponding, preferably, with the width of the slats B, and the edges register with the slats, whereby the horizontal spaces between the boards register with the openings $a$ between slats. The boards taper in thickness preferably from the edges $r$ to or nearly to the edges $r'$. The forward edge of each board M is formed, as shown in Figs. 1 and 11, with a projecting part $r^2$ and preferably concave parts $r^3$ $r^4$. When the boards are rendered tapering, as described, the openings or passages between them at the edges $r^4$ are wider in the vertical plane than the openings $a$ between slats.

In operation when a picker-stem is in the position $x$, Fig. 1, it starts to enter between the guide-boards M at the projecting portions $r^2$. Thus the part of the stem near its shank portion first enters the openings and the free end of the stem is the last to enter. In case the stem is bent it will not be so far out of a straight line at its shank portion as at its free end. The shank portions of the stems as they are provided would not stand being bent to a greater angle than the openings between boards at $r^2$ would admit without the stems being broken off in the plants. When a shank enters between the projections $r^2$, the rest of the stem must enter, even though it has to be bent toward the straight line by contact with a board-surface. When the stem passes the position shown by the next stem in full lines in Fig. 1, the pinion $c$ of the respective carrier engages the rack E, and the spindle is revolved as it progresses farther through the opening between boards. This rotation tends to straighten the stem, if bent, by rotating it against the surfaces of the boards, and the stem is guided through the respective slot $a$ without danger of its striking and injuring any of the slats D. If desired, the openings between boards at the edges $r$ may be somewhat more contracted than the openings $a$, whereby when the stem has become bent in a plant its passage one or more times between the guide-boards will have the effect of rendering it perfectly straight, or substantially so.

Except for the possible breaking of an occasional picker-stem in a plant the only things that can happen to the stems themselves to interfere with their perfect operation are their becoming bent or clogged with sap or the like. My improvements described overcome these difficulties, and although I prefer to construct the parts in the manner shown they may be variously changed to perform in the same or a modified way the same general functions without departing from the spirit of my invention as set forth in the claims.

What I claim as new, and desire to secure by Letters Patent, is—

1. In a cotton-harvester, the combination with serrated cotton-gathering picker-stems and means for moving them operatively along an endless path and for stripping the gathered cotton therefrom, of a sap-removing tooth-cleaning device for the said stems, supported in said path.

2. In a cotton-harvester, the combination with serrated cotton-gathering picker-stems and means for moving them operatively along an endless path and for stripping the gathered cotton therefrom, of a sap-removing tooth-cleaning device and means for adjusting it into and out of said path.

3. In a cotton-harvester, the combination with serrated cotton-gathering picker-stems and means for moving them operatively along an endless path and for stripping the gathered cotton therefrom, of a sap-removing tooth-cleaning brush for the said stems supported in said path.

4. In a cotton-harvester, the combination with serrated cotton-gathering picker-stems and means for moving them operatively along an endless path and for stripping the gathered cotton therefrom, of a sap-removing tooth-cleaning wire brush for the said stems, supported in said path.

5. In a cotton-harvester, the combination with an endless series of traveling carriers supporting horizontal series of cotton-gathering picker-stems and means for stripping the gathered cotton from the stems, of a sap-removing cleaning device presenting a tooth-cleaner in the path of each of said horizontal series of stems.

6. In a cotton-harvester, the combination with an endless series of traveling carriers supporting horizontal series of cotton-gathering picker-stems and means for stripping the gathered cotton from the stems, of a cleaning device provided with a sap-removing tooth-cleaning brush in the path of each of the said horizontal series of stems.

7. In a cotton-harvester, the combination with an endless series of traveling carriers supporting horizontal series of cotton-gathering picker-stems and means for stripping the gathered cotton from the stems, of a sap-removing cleaning device comprising a relatively stationary support, arms on the support and brushes on the arms across which the stems are drawn in the movement of the carriers.

8. In a cotton-harvester, the combination with an endless series of traveling carriers supporting horizontal series of cotton-gathering picker-stems and means for stripping the gathered cotton from the stems, of a sap-removing cleaning device comprising a relatively stationary support, arms on the support and brushes on the arms across which the stems are drawn in the movement of the carriers, the support being adjustable to move the brushes into and out of operative position.

9. In a cotton-harvester, the combination with an endless series of traveling carriers supporting horizontal series of cotton-gathering picker-stems and means for stripping the gathered cotton from the stems, of a stationary support, arms on the support extending between the paths of said stems, and sap-removing brushes fastened against said arms to project into the paths of said stems.

10. In a cotton-harvester, the combination with an endless series of carriers, serrated cotton-gathering picker-stems on the carriers and means for stripping the gathered cotton from the stems, of a relatively stationary tooth-cleaning and sap-removing device for and in the path of said stems, and propelling and turning means for the carriers operating to draw the stems longitudinally across said device.

11. In a cotton-harvester, the combination with an endless series of carriers, serrated cotton-gathering picker-stems on the carriers and means for stripping the gathered cotton from the stems, of a relatively stationary tooth-cleaning and sap-removing device for the said stems, and propelling and turning means for the carriers operating to draw the stems longitudinally and laterally across said device.

12. In a cotton-harvester, the combination with an endless series of carriers, serrated cotton-gathering picker-stems on the carriers, and a stripping device for the stems, of a relatively stationary tooth-cleaning device for and in the path of said stems in their movement beyond the stripping device, and propelling and turning means for the carriers operating to draw the stems across said cleaning device.

13. In a cotton-harvester, the combination with an endless series of carriers, cotton-gathering picker-stems on the carriers having longitudinal series of teeth and means for stripping the gathered cotton from the stems, of brush-supports extending between the paths of said stems, sap-removing brushes on the supports to engage the said stems at one side, and guiding, propelling and turning means for the carriers and stems, operating to move the stems at their toothed sides across the brushes.

14. In a cotton-harvester, the combination with the cotton-gathering picker-stems and means for moving them operatively along an endless path, of a straightening device for the said stems supported along said path.

15. In a cotton-harvester, the combination with the cotton-gathering picker-stems and means for moving them operatively along an endless path, of a straightening device for the said stems comprising parallel boards presenting walls at opposite sides of said path between which the stems rotate, as set forth.

16. In a cotton-harvester, the combination with a casing having a side formed with slats presenting horizontal longitudinally-extending openings between them, and endless series of traveling carriers in the casing provided with rotary picker-stems movable outward through said openings, of parallel stem straightening and guiding boards in the casing extending along opposite sides of the paths of the stems to said slats, substantially as set forth.

17. In a cotton-harvester, the combination with a casing having a side formed with slats presenting longitudinally-extending openings between them, and endless series of traveling carriers in the casing provided with rotary picker-stems movable in a direction longitudinally and laterally through said openings as they are thrust into the cotton-plants, of parallel picker-stem-guiding boards in the casing extending along opposite sides of the path of the stems to said slats.

18. In a cotton-harvester, substantially as described, a series of stationary and parallel picker-stem-straightening guide-boards forming gradually-reduced guide-openings between them for the passage of the stems, and means for rotating the stems during their passage between said boards.

19. In a cotton-harvester, substantially as described, a series of stationary and parallel picker-stem-straightening guide-boards forming gradually-reducing guide-openings for the passage of the stems, and provided with the initial shank-guiding projections $r^2$, and means for rotating the stems during their passage between the guide-boards.

20. In a cotton-harvester, substantially as described, a series of stationary and approximately parallel picker-stem-straightening guide-boards M of gradually-increasing thickness and having the edges $r^3$ $r^4$ with the projecting edge portion $r^2$ between them, substantially as and for the purpose set forth.

In testimony whereof I have signed my name to this specification in the presence of two subscribing witnesses.

ANGUS CAMPBELL.

Witnesses:
ALBERT D. BACCI,
WM. B. DAVIES.